United States Patent
Ihara (10) Patent No.: US 8,329,069 B2
(45) Date of Patent: *Dec. 11, 2012

(54) METHOD OF FABRICATING A MOLD AND PRODUCING AN ANTIREFLECTION FILM USING THE MOLD

(75) Inventor: Ichiro Ihara, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/735,032

(22) PCT Filed: Dec. 22, 2009

(86) PCT No.: PCT/JP2009/007140
§ 371 (c)(1),
(2), (4) Date: Jun. 10, 2010

(87) PCT Pub. No.: WO2010/073636
PCT Pub. Date: Jul. 1, 2010

(65) Prior Publication Data
US 2010/0283165 A1 Nov. 11, 2010

(30) Foreign Application Priority Data
Dec. 26, 2008 (JP) .................................. 2008-333674

(51) Int. Cl.
*B29D 11/00* (2006.01)

(52) U.S. Cl. ............. 264/1.36; 205/70; 216/24; 216/26; 264/1.7; 264/2.5

(58) Field of Classification Search .................... 264/2.5, 264/1.7, 1.36, 1.38; 216/24, 26; 205/70
See application file for complete search history.

(56) References Cited

U.S. PATENT DOCUMENTS

| 4,547,275 | A  | * | 10/1985 | Ejima et al. .................... 205/661 |
| 6,359,735 | B1 |   | 3/2002  | Gombert et al. |
| 7,066,234 | B2 |   | 6/2006  | Sawitowski |
| 2001/0051442 | A1 | | 12/2001 | Katsir et al. |
| 2007/0159698 | A1 | | 7/2007  | Taguchi et al. |

FOREIGN PATENT DOCUMENTS

EP 1 785 748 5/2007

(Continued)

OTHER PUBLICATIONS

Office Action for corresponding U.S. Appl. No. 12/805,189 dated Apr. 13, 2011.
Y. Kanamori et al., "100 nm period silicon antireflection structures fabricated using a porous alumina membrane mask," Applied Physics Letters, vol. 78, No. 2, Jan. 8, 2001, pp. 142-143.

(Continued)

*Primary Examiner* — Mathieu D. Vargot
(74) *Attorney, Agent, or Firm* — Harness, Dickey & Pierce, P.L.C.

(57) ABSTRACT

A motheye mold fabrication method of at least one embodiment of the present invention includes the steps of: (a) preparing an Al base in which an Al content is less than 99.99 mass %; (b) partially anodizing the Al base to form a porous alumina layer which has a plurality of very small recessed portions; (c) after step (b), allowing the porous alumina layer to be in contact with an etchant which contains an anodic inhibitor, thereby enlarging the plurality of very small recessed portions of the porous alumina layer; and (d) after step (c), further anodizing the Al base to grow the plurality of very small recessed portions.

14 Claims, 5 Drawing Sheets

FOREIGN PATENT DOCUMENTS

| | | |
|---|---|---|
| JP | 2001-517319 | 10/2001 |
| JP | 2003-531962 | 10/2003 |
| JP | 2005-156695 | 6/2005 |
| JP | 2007-086283 | 4/2007 |
| JP | 2008-209867 | 9/2008 |
| WO | WO2006/059686 | 6/2006 |
| WO | WO 2008/082421 | 7/2008 |
| WO | WO2009/147858 | 12/2009 |

OTHER PUBLICATIONS

"Standard electrode potential (data page)" from Wikipedia, the free encyclopedia, Anonymous, Feb. 10, 2011.

English translation of the International Preliminary Report on Patentability (Chapter I) for international patent application No. PCT/JP2009/007140 dated Aug. 25, 2011.

Office Action for corresponding U.S. Appl. No. 12/805,189 dated May 17, 2012.

* cited by examiner

METHOD OF FABRICATING A MOLD AND PRODUCING AN ANTIREFLECTION FILM USING THE MOLD

CROSS-REFERENCE TO RELATED APPLICATIONS

This application is a National Stage of International Application No. PCT/JP2009/007140, filed on Dec. 22, 2009, which claims the benefit of Japanese Patent Application No. 2008-333674, filed on Dec. 26, 2008.

TECHNICAL FIELD

The present invention relates to a method of fabricating a mold and a method of producing an antireflection film using the mold. In this specification, the "mold" includes molds that are for use in various processing methods (stamping and casting), and is sometimes referred to as a stamper. The mold can also be used for printing (including nanoprinting).

BACKGROUND ART

Display devices for use in TVs, cell phones, etc., and optical elements, such as camera lenses, etc., usually adopt an antireflection technique in order to reduce the surface reflection and increase the amount of light transmitted therethrough. This is because, when light is transmitted through the interface between media of different refractive indices, e.g., when light is incident on the interface between air and glass, the amount of transmitted light decreases due to, for example, Fresnel reflection, thus deteriorating the visibility.

An antireflection technique which has been receiving attention in recent years is forming over a substrate surface a very small uneven pattern in which the interval of recessed portions or raised portions is not more than the wavelength of visible light ($\lambda$=380 nm to 780 nm). See Patent Documents 1 to 4. The two-dimensional size of a raised portion of an uneven pattern which performs an antireflection function is not less than 10 nm and less than 500 nm.

This method utilizes the principles of a so-called motheye structure. The refractive index for light that is incident on the substrate is continuously changed along the depth direction of the recessed portions or raised portions, from the refractive index of a medium on which the light is incident to the refractive index of the substrate, whereby reflection of a wavelength band that is subject to antireflection is prevented.

The motheye structure is advantageous in that it is capable of performing an antireflection function with small incident angle dependence over a wide wavelength band, as well as that it is applicable to a number of materials, and that an uneven pattern can be directly formed in a substrate. As such, a high-performance antireflection film (or antireflection surface) can be provided at a low cost.

As the method of forming a motheye structure, using an anodized porous alumina which is obtained by means of anodization (or "anodic oxidation") of aluminum has been receiving attention (Patent Documents 2 to 4).

Now, the anodized porous alumina which is obtained by means of anodization of aluminum is briefly described. Conventionally, a method of forming a porous structure by means of anodization has been receiving attention as a simple method for making nanometer-scale micropores (very small recessed portions) in the shape of a circular column in a regular arrangement. An aluminum base is immersed in an acidic electrolytic solution of sulfuric acid, oxalic acid, phosphoric acid, or the like, or an alkaline electrolytic solution, and this is used as an anode in application of a voltage, which causes oxidation and dissolution. The oxidation and the dissolution concurrently advance over a surface of the aluminum base to form an oxide film which has micropores over its surface. The micropores, which are in the shape of a circular column, are oriented vertical to the oxide film and exhibit a self-organized regularity under certain conditions (voltage, electrolyte type, temperature, etc.). Thus, this anodized porous alumina is expected to be applied to a wide variety of functional materials.

A porous alumina layer fabricated under specific conditions includes cells in the shape of a generally regular hexagon which are in a closest packed two-dimensional arrangement when seen in a direction perpendicular to the film surface. Each of the cells has a micropore at its center. The arrangement of the micropores is periodic. The cells are formed as a result of local dissolution and growth of a coating. The dissolution and growth of the coating concurrently advance at the bottom of the micropores which is referred to as a barrier layer. As known, the size of the cells, i.e., the interval between adjacent micropores (the distance between the centers), is approximately twice the thickness of the barrier layer, and is approximately proportional to the voltage that is applied during the anodization. It is also known that the diameter of the micropores depends on the type, concentration, temperature, etc., of the electrolytic solution but is, usually, about ⅓ of the size of the cells (the length of the longest diagonal of the cell when seen in a direction vertical to the film surface). Such micropores of the porous alumina may constitute an arrangement which has a high regularity (periodicity) under specific conditions, an arrangement with a regularity degraded to some extent depending on the conditions, or an irregular (non-periodic) arrangement.

Patent Document 2 discloses a method of producing an antireflection film (antireflection surface) by a transfer method with the use of a stamper which has an anodized alumina film over its surface.

Patent Document 3 discloses the technique of forming tapered recesses with continuously changing pore diameters by repeating anodization of aluminum and a pore diameter increasing process.

The present applicant discloses in Patent Document 4 the technique of forming an antireflection film with the use of an alumina layer in which very small recessed portions have stepped side surfaces.

As described in Patent Documents 1, 2, and 4, by providing an uneven structure (macro structure) which is greater than a motheye structure (micro structure) in addition to the motheye structure, the antireflection film (antireflection surface) can be provided with an antiglare function. The size of a raised portion of the uneven structure which is capable of performing the antiglare function is not less than 1 μm and less than 100 μm. The entire disclosures of Patent Documents 1, 2, and 4 are herein incorporated by reference.

Utilizing such an anodized aluminum film can facilitate the fabrication of a mold which is used for formation of a motheye structure over a surface (hereinafter, "motheye mold"). In particular, as described in Patent Documents 2 and 4, when the surface of the anodized aluminum film as formed is used as a mold without any modification, a large effect of reducing the manufacturing cost is achieved.

Citation List

Patent Literature

Patent Document 1: Japanese PCT National Phase Laid-Open Publication No. 2001-517319

Patent Document 2: Japanese PCT National Phase Laid-Open Publication No. 2003-531962

Patent Document 3: Japanese Laid-Open Patent Publication No. 2005-156695

Patent Document 4: WO 2006/059686

SUMMARY OF INVENTION

Technical Problem

However, according to the researches conducted by the present inventor, using an anodized film as formed over a surface of an aluminum base (hereinafter, "Al base") as a motheye mold without any modification will face a problem that the rigidity and/or the processability (e.g., machinability) is low. For example, even when an anodized film is formed over a highly-pure aluminum plate, such as an aluminum plate of 99.99% (or "4N") described in Patent Document 3, a practical motheye mold cannot be fabricated from the aluminum plate with a thickness of several millimeters to several tens of centimeters, because of its low rigidity. As a matter of course, the rigidity of the aluminum plate can be increased by increasing the thickness of the aluminum plate. However, this solution causes waste of various resources, typically waste of source materials, and is therefore not applicable to mass production.

In this specification, an "Al base" does not include a thin film of Al, but refers to Al in bulk which is self-supporting and which is in the form of a plate with a thickness of not less than 2 mm, or in the form of a circular cylinder or circular column.

Figure 5:
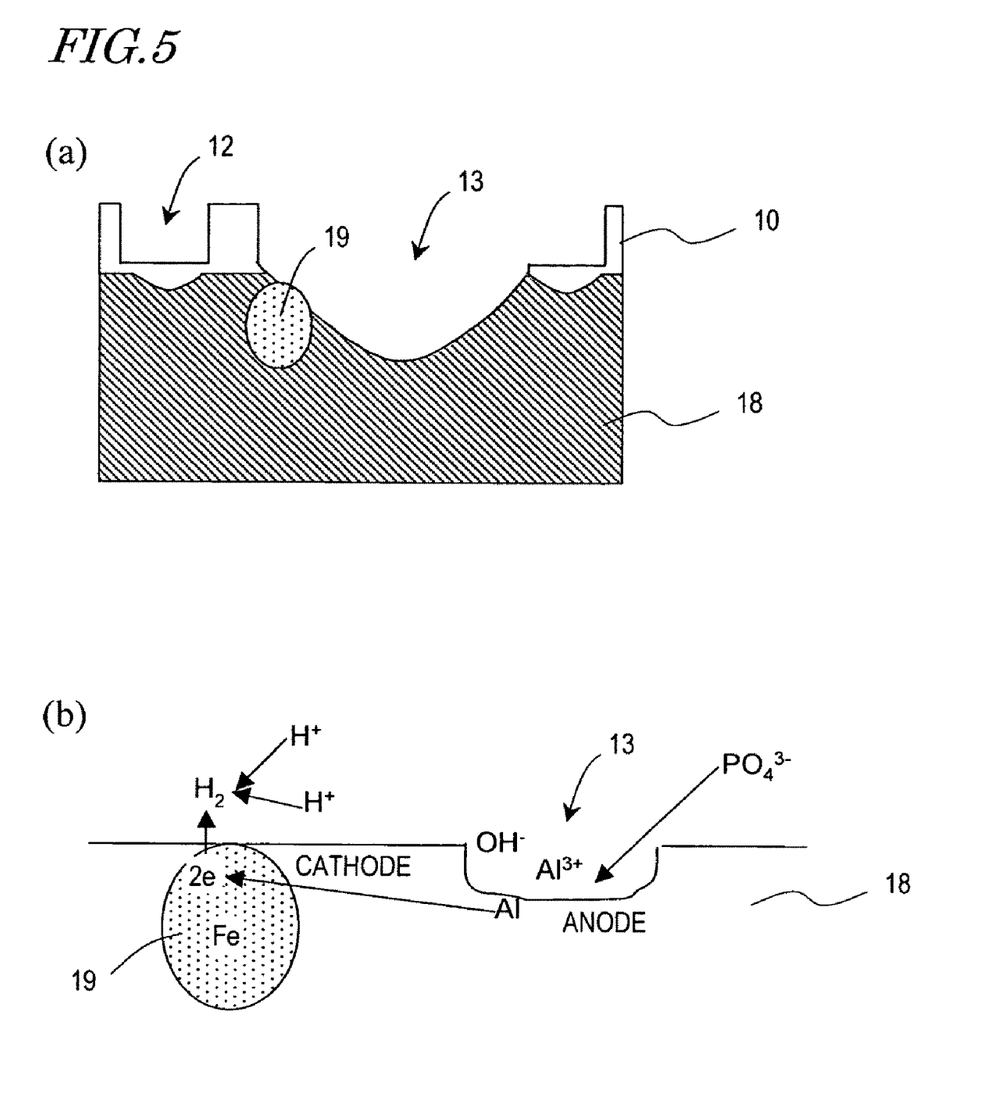

On the other hand, when an aluminum plate which contains an impurity element (for example, JIS 1050 (aluminum purity: 99.50 mass % or higher)) is used with the view of obtaining sufficient rigidity and processability, pits (hollows) larger than the above-described micropores are formed (see FIG. 5). This may not be used for formation of a motheye structure with excellent antireflection characteristics.

The present invention was conceived to solve the above problems. One of the major objects of the present invention is to provide a method of fabricating a mold of an Al base having an anodized film which can be used without any modification as a mold for formation of a motheye structure.

Solution to Problem

A mold fabrication method of the present invention is a method of fabricating a mold that is for use in forming a motheye structure over a surface, the motheye structure including a plurality of first raised portions each having a two-dimensional size of not less than 10 nm and less than 500 nm when seen in a direction normal to the surface, the method including the steps of: (a) preparing an Al base in which an Al content is less than 99.99 mass %; (b) partially anodizing the Al base to form a porous alumina layer which has a plurality of very small recessed portions; (c) after step (b), allowing the porous alumina layer to be in contact with an etchant which contains an anodic inhibitor, thereby enlarging the plurality of very small recessed portions of the porous alumina layer; and (d) after step (c), further anodizing the Al base to grow the plurality of very small recessed portions. In the motheye structure, the distance between adjacent first raised portions is preferably not less than 30 nm and less than 600 nm.

In the mold fabrication method of the present invention, instead of using the etchant which contains the anodic inhibitor (countermeasure a), an Al base may be used which contains not more than 10 ppm of an element whose standard electrode potential is higher than Al and not less than 0.1 mass % of an element whose standard electrode potential is lower than Al (countermeasure b). Alternatively, the step of forming an additional barrier layer of alumina may be further performed before step (c) (countermeasure c). Alternatively, any two of the above three countermeasures a to c may be employed in combination. Further, the etchant used may contain a compound which can form a coating over the surface of the Al base, in place of or together with the anodic inhibitor.

In one embodiment, after step (d), step (c) and step (d) are further performed. Note that a series of the steps preferably ends with the anodization step (the step of growing the very small recessed portions). However, it may end with the etching step (the step of enlarging the very small recessed portions).

In one embodiment, the Al base contains at least one element that is selected from the group consisting of Fe, Si, Cu, Mn, Zn, Ni, Ti, Pb, Sn, and Mg.

In one embodiment, the Al base contains not more than 10 ppm of an element whose standard electrode potential is higher than Al and not less than 0.1 mass % of an element whose standard electrode potential is lower than Al.

In one embodiment, the Al base contains Mg of not less than 0.1 mass % and not more than 7.0 mass %

In one embodiment, the anodic inhibitor is organic.

In one embodiment, the etchant contains a compound which forms a coating over a surface of the Al base.

In one embodiment, the etchant contains an organic acid. Preferably, both the acid and the anodic inhibitor are organic.

In one embodiment, the method further includes, before step (c), forming an additional barrier layer of alumina.

In one embodiment, the method further includes, before step (b), giving an uneven shape to a surface of the alumina base, the uneven shape including a plurality of second raised portions each having a two-dimensional size of not less than 0.1 μm and not more than 100 μm. In the uneven structure, the distance between adjacent second raised portions is preferably not less than 0.1 μm and not more than 100 μm.

A method of producing an antireflection film according to the present invention, includes: preparing a mold fabricated according to any of the fabrication methods as set forth above and a workpiece; and forming the motheye structure over a surface of the workpiece using the mold.

In one embodiment, the method includes the step of curing a photocurable resin interposed between the mold and the surface of the workpiece, thereby forming a photocurable resin layer which has the motheye structure over the surface of the workpiece.

Advantageous Effects of Invention

The present invention provides a method of fabricating a mold of an Al base having an anodized film, which can be used without any modification as a mold for formation of a motheye structure.

BRIEF DESCRIPTION OF DRAWINGS

[FIG. 1](a) to (e) are schematic cross-sectional views for illustrating a method of fabricating a motheye mold according to an embodiment of the present invention.

[FIG. 2](a) is a SEM image of a surface of a porous alumina layer formed according to the fabrication method of the embodiment of the present invention. (b) is a SEM image of a surface of a porous alumina layer formed according to a conventional fabrication method.

[FIGS. 3](a) and (b) are schematic diagrams for illustrating a function of a compound which forms a coating over a surface of an Al base.

[FIG. 4](a) is a diagram schematically illustrating formation of pits in a barrier layer of alumina due to locally thin portions. (b) is a schematic diagram for illustrating that formation of pits can be prevented by forming an additional barrier layer 16.

[FIGS. 5](a) and (b) are schematic diagrams for explaining a cause of a problem that using an Al base which contains an impurity element leads to formation of pits (hollows).

DESCRIPTION OF EMBODIMENTS

Hereinafter, a method of fabricating a motheye mold according to an embodiment of the present invention is described with reference to the drawings.

First, a cause of a problem that using the above-described Al base which contains an impurity element leads to formation of pits (hollows), which can be solved by the present invention, is explained with reference to FIGS. 5(a) and 5(b).

FIG. 5(a) is a cross-sectional view schematically illustrating formation of a pit (hollow) 13 which is larger than a micropore 12 in an etching step that is performed for the purpose of enlarging the micropore 12 after formation of a porous alumina layer (anodized film) 10 with the use of an Al base 18 which contains an impurity element 19. The pit 13 is formed in the vicinity of the impurity element 19. The impurity element 19 is segregated at a grain boundary between aluminum crystalline grains of the Al base 18. The pits 13 are formed concentratedly at a grain boundary (see FIG. 2(b) which will be described later).

As schematically shown in FIG. 5(b), it is considered that the pit 13 would be formed by a local cell reaction. For example, if Fe is contained as the impurity element 19, Fe serves as a cathode because the standard electrode potential of Fe (−0.44 V) is higher than that of Al (−1.70 V), and Al is anodically dissolved in the etchant. By one cycle of the etching step, a large number of pits 13 with a diameter of about 1 µm are formed. Therefore, during repetition of the anodization and the etching, the pits 13 are further enlarged, so that a desired motheye mold cannot be fabricated.

The method of fabricating a mold according to the embodiment of the present invention inhibits formation of the above-described pits. FIGS. 1(a) to 1(e) are schematic cross-sectional views for illustrating the method of fabricating a mold according to the embodiment of the present invention.

First, as shown in FIG. 1(a), an Al base 18 in which the Al content is less than 99.99 mass % is prepared. The impurity element contained in the Al base may preferably be at least one element that is selected from the group consisting of Fe, Si, Cu, Mn, Zn, Ni, Ti, Pb, Sn, and Mg. Mg is particularly preferable. According to the researches conducted by the present inventor, the mechanism of formation of pits (hollows) in the etching step is a local cell reaction. Therefore, ideally, the Al base does not contain any element which is nobler than Al. Preferably, the Al base used contains, as the impurity element, Mg (standard electrode potential: −2.36 V) which is a base metal. If the content of an element nobler than Al is 10 ppm or less, it can be said in terms of electrochemistry that the Al base does not substantially contain the element. The Mg content is preferably 0.1 mass % or more of the whole. It is preferably 7.0 mass % or less, and more preferably, about 3.0 mass % or less. If the Mg content is less than 0.1 mass %, sufficient rigidity cannot be obtained. On the other hand, as the Mg content increases, segregation of Mg is more likely to occur. Even if the segregation occurs near a surface over which a motheye mold is to be formed, it would not be detrimental in terms of electrochemistry. However, Mg forms an anodized film of a different form from that of Al, and therefore, the segregation of Mg would be a cause of a defect. The content of the impurity element may be appropriately determined depending on the shape, thickness, and size of the Al base 18, in view of required rigidity and/or processibility. For example, when an Al base in the form of a plate is prepared by rolling, the appropriate Mg content is about 3.0 mass %. When an Al base having a three-dimensional structure of, for example, a circular cylinder is prepared by extrusion, the Mg content is preferably 2.0 mass % or less. If the Mg content exceeds 2.0 mass %, the extrudability deteriorates in general.

Note that, before being subjected to an anodization step, the surface of the Al base 18 is cleaned as necessary. For example, a porous alumina layer (anodized film) which is formed over the surface of the Al base 18 by anodizing the surface of the Al base 18 is removed.

Then, as shown in FIG. 1(b), the surface of the Al base 18 is anodized to form a porous alumina layer 10 which has micropores 12 in its surface. By controlling the conditions and duration of the anodization, the size of the micropores, the formation density of the micropores, the depth of the micropores, the regularity in the arrangement of the micropores, etc., are controlled. For example, when using a 0.1 M oxalic aqueous solution at 20° C. with application of a voltage at 80 V for 40 seconds, the resultant porous alumina layer 10 has a thickness of about 100 nm, and the distance between adjacent micropores is 190 nm.

Then, as shown in FIG. 1(c), the porous alumina layer 10 having the micropores 12 is brought into contact with an etchant such that a predetermined amount is etched away, whereby the diameter of the micropores 12 is increased. By adopting wet etching in this step, the micropore walls and a barrier layer can be substantially isotropically enlarged. The etching amount (i.e., the size and depth of the micropores 12) can be controlled by adjusting the type and concentration of the etchant and the etching duration.

The etchant used may be an aqueous solution of an organic acid, such as phosphoric acid, formic acid, acetic acid, citric acid, or the like, of 10 mass % for example.

Here, the etchant may preferably contain an anodic inhibitor. Using the etchant which contains an anodic inhibitor inhibits formation of pits. Even when the impurity element contained in the Al base 18 is Mg, there is a probability that the Al base 18 is contaminated with any other impurity element. In terms of stable mass production, an etchant containing an anodic inhibitor is preferably used. The anodic inhibitor adsorbs Al that constitutes an anode to neutralize the electrode potential, thereby preventing anodic dissolution of aluminum.

Examples of inorganic ions which have the effects of the anodic inhibitor include $CrO_4^{2-}$, $NO_2^-$, $WO_4^{3-}$, $MOO_4^{3-}$, $SO_3^{2-}$, and $SiO_2^{2-}$. Examples of organic compounds which have the effects of the anodic inhibitor include thiophenol, mercaptan, thiocresol, sulphide, oxysulphide, aldehyde, and ketone. The concentration of the anodic inhibitor may be appropriately determined depending on the type of the acid and the anodic inhibitor. In terms of the control cost of the etchant, for example, it is preferable that both the acid and the anodic inhibitor contained in the etchant are organic.

Thereafter, as shown in FIG. 1(d), the Al base 18 is again partially anodized such that the micropores 12 grow deeper while the porous alumina layer 10 becomes thicker. In this step, the growth of the micropores 12 starts from the bottom of the already-formed micropores 12, and as such, the side surface of the resultant micropores 12 generally has a stepped shape.

Thereafter, when necessary, the porous alumina layer 10 is brought into contact with an etchant of alumina to be further etched such that the diameter of the micropores 12 is further increased as shown in FIG. 1(e). The etchant used in this step may preferably be the above-described etchant. Practically, the same etching bath may be used.

The series of the above-described processes preferably ends with the anodization step. When the etching step of FIG. 1(e) is carried out, another anodization step is preferably performed. By ending with the anodization step (without performing any subsequent etching step), the micropores 12 can have small bottoms. Thus, in a motheye structure which is formed using the resultant motheye mold, the raised portions can have small tips, so that the antireflection effects can be improved.

In this way, by repeating the above-described anodization step (FIG. 1(b)) and the etching step (FIG. 1(c)), the porous alumina layer 10 provided with the micropores (very small recessed portions) 12, which has a desired uneven pattern, can be obtained. By appropriately determining the conditions for each of the anodization steps and the etching steps, the size, formation density, and depth of the micropores 12 as well as the stepped shape of the side surface of the micropores 12 can be controlled.

In the example described herein, the anodization step and the etching step are alternately performed. However, between the anodization step and the etching step, or between the etching step and the anodization step, a washing step and a drying step subsequent thereto may be performed.

Figure 2:
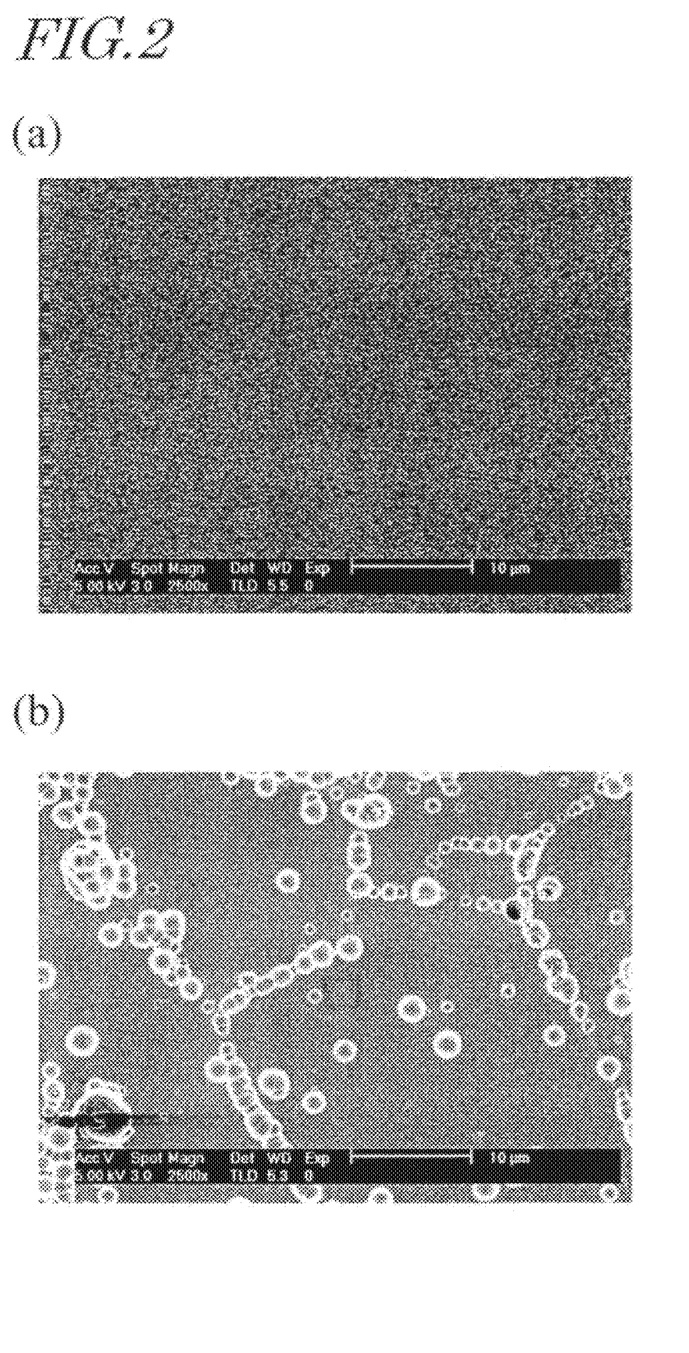

FIG. 2(a) shows a SEM image of a surface of a porous alumina layer formed according to the fabrication method of the present embodiment. An Al base containing Fe and Si of 500 ppm in total was used. The Al base used had a cylindrical shape with the diameter of 200 mm, the length of 500 mm, and the thickness of 7 mm. The Al base was anodized with a 0.1 M oxalic aqueous solution at 20° C. with application of a voltage at 80 V for 40 seconds, and then etched for 120 minutes with an etchant containing a phosphoric acid of 6.2 mass % and a chromic acid of 2.7 mass % at 60° C.

For comparison, FIG. 2(b) shows a SEM image of a surface of a porous alumina layer formed according to a conventional fabrication method. The Al base used was the same as that used in the above example. The Al base was anodized under the same conditions and thereafter etched for 30 minutes with an etchant containing a phosphoric acid of 10 mass % (and not containing an anodic inhibitor) at 60° C.

As seen from FIG. 2(b), the surface of the porous alumina layer formed according to the conventional fabrication method had a large number of pits. The pits were formed concentratedly at the grain boundary of aluminum crystalline grains. Segregation of impurities at the grain boundary was confirmed by an energy dispersed fluorescent X-ray analysis (EDX analysis).

As clearly seen from the comparison of FIG. 2(a) and FIG. 2(b), using the etchant containing the anodic inhibitor inhibited formation of pits. Since the effect achieved by adding the anodic inhibitor was confirmed, it can be said conversely that the mechanism of formation of pits is the above-described anodic dissolution by a local cell reaction.

The etchant may contain a compound which forms a coating over the surface of the Al base, together with or in place of the anodic inhibitor.

Figure 3:
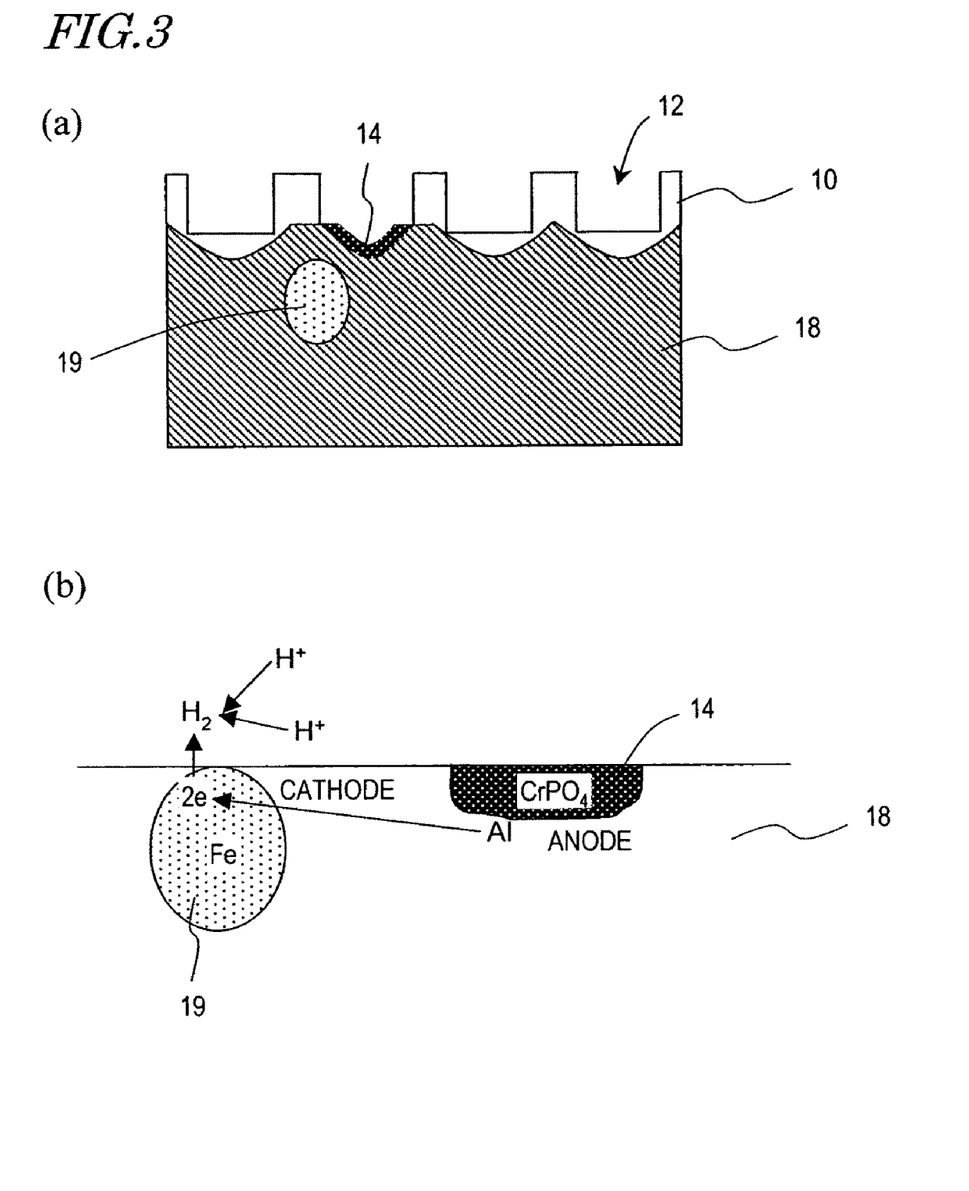

For example, the chromic acid which serves as the anodic inhibitor also has the function of forming a coating 14 as shown in FIGS. 3(a) and 3(b). As the alumina is etched in the etching step such that aluminum is exposed (to be in contact with the etchant), aluminum hydroxide is produced. Therefore, the pH of the etchant rises near the aluminum-exposed portion, so that the equilibrium expressed by the formula shown below deviates to the right side. As a result, a $CrPO_4$ film is formed over the aluminum-exposed portion, so that formation of pits is inhibited.

Another example of the etchant which has the property of forming a coating over the surface of the Al base is a mixture of a phosphoric acid of 2 mass %, zinc phosphate in an amount equivalent to 3 mass %, and a fluoric acid in an amount equivalent to 1 mass %. The alumina is dissolved in this etchant so that the micropores are enlarged. In this process, tribasic zinc phosphate and aluminum fluoride are deposited over the aluminum surface to form a coating, whereby formation of pits are inhibited. In the etchant, the reaction expressed by the formula below occurs:

The Al base is immersed in this etchant for 10 minutes, whereby very small recessed portions (micropores) can be enlarged without formation of pits.

Examples of the etchant having the above properties include, other than the aforementioned examples, a fluorozirconic acid/phosphoric acid/fluoric acid mixture solution, a titanium fluoride/phosphoric acid/fluoric acid mixture solution, and a phosphoric acid/n-butyl alcohol/isopropyl alcohol mixture solution.

As described above, pits are mainly formed by anodic dissolution of aluminum. However, as shown in FIG. 4(a), if an alumina barrier layer (part extending from the bottoms of the micropores 12 to the surface of the Al base) includes a locally thin portion (portion of thickness $d_0$ in FIG. 4(a)), there is a probability that in the etching step the thin portion of the barrier layer is removed earlier than the other portions, so that the etchant reaches the surface of the Al base, and pits are formed therein.

Figure 4:
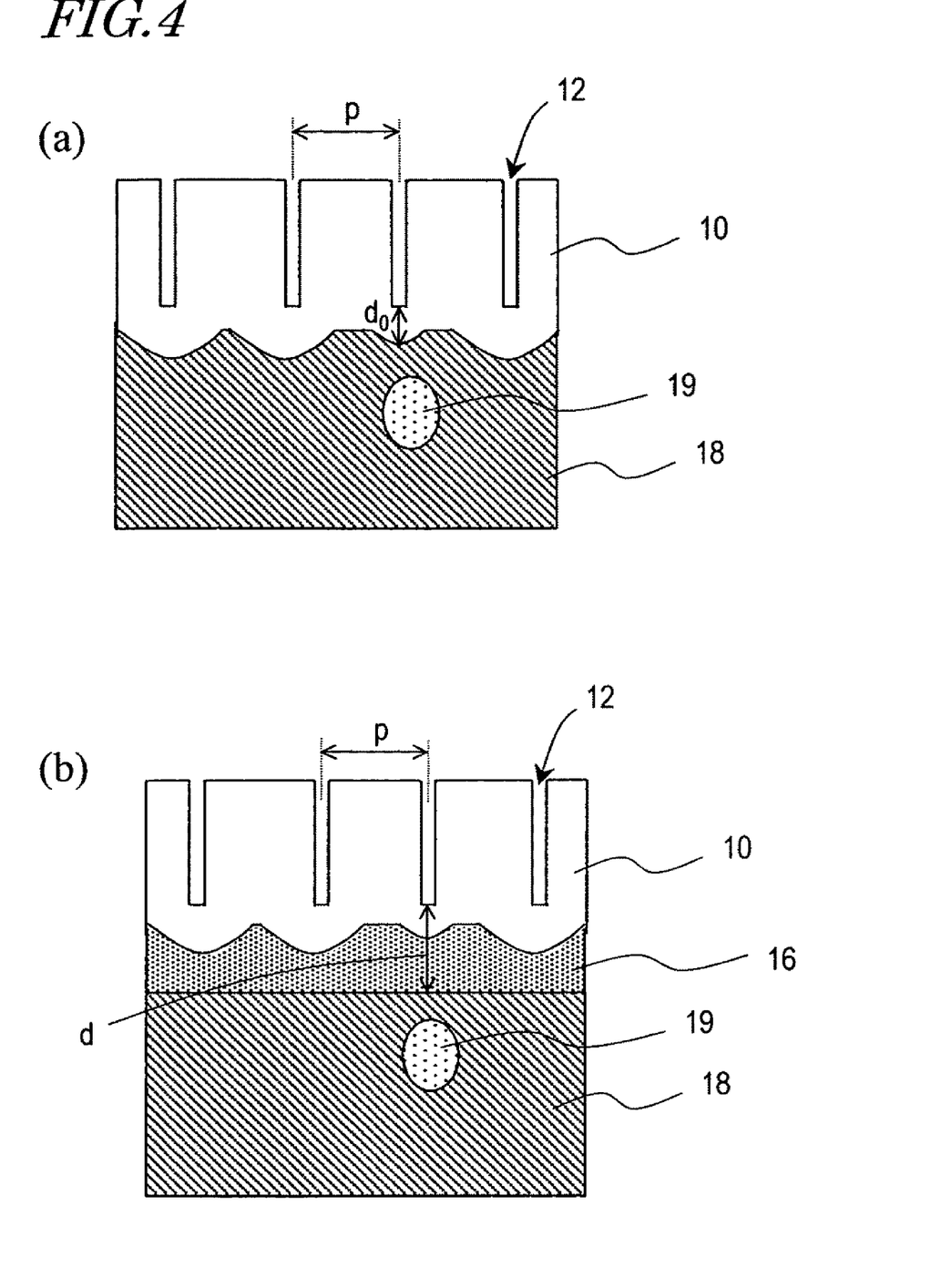

To prevent formation of pits which is attributed to this cause, the step of forming an additional barrier layer 16 of alumina as shown in FIG. 4(b) may be added before the etching step (FIG. 1(c) and/or FIG. 1(e)). In other words, the thickness of the barrier layer, d, may be increased as shown in FIG. 4(b).

The reason that micropores are formed in alumina is that alumina is dissolved in an acidic or alkaline electrolytic solution (a solution for anodization). As known in the art, assuming that the average interval between adjacent micropores 12 is p, the thickness of the barrier layer is about p/2. If the electrolytic solution is neutral or weakly acidic, dissolution of alumina does not occur, so that the anodization can be performed without formation of micropores. In this step, the thickness of the alumina layer formed by the anodization (the thickness of the additional barrier layer 16) depends on the voltage of the anodization and is 1.4 nm/V at the maximum.

Figure 1:
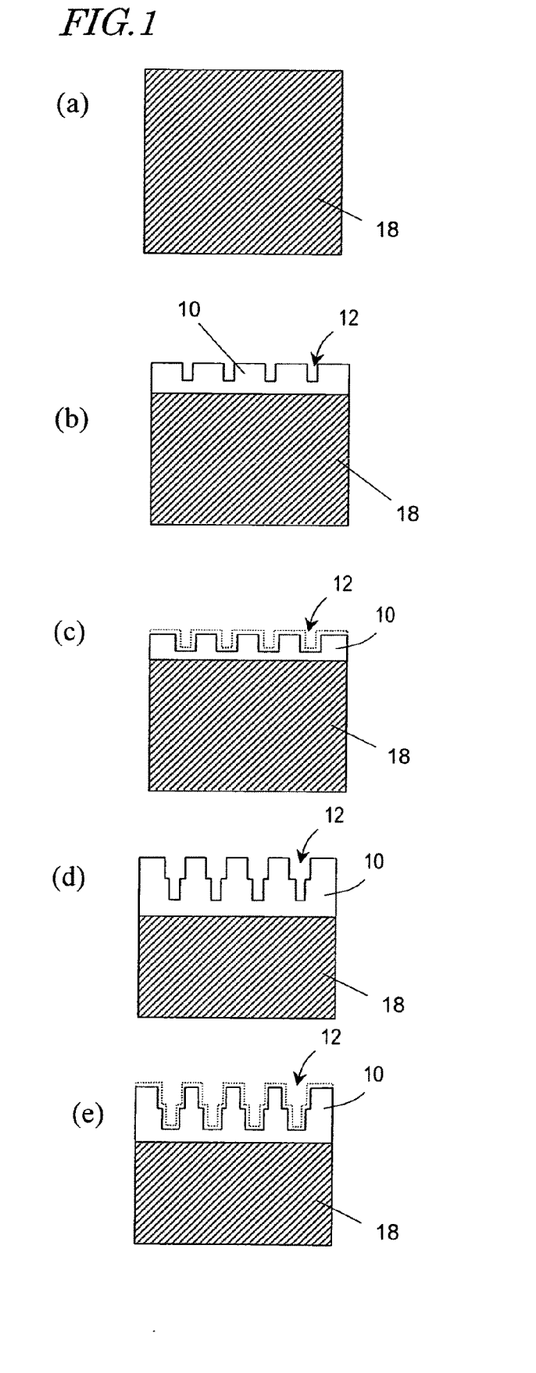

For example, in the mold fabrication method previously described with reference to FIG. 1, at a point in time after the first anodization step (FIG. 1(b)) but prior to the subsequent etching step (FIG. 1(c)), anodization may be performed in a 1 mass % boric acid aqueous solution at 20° C. with application of a voltage at 200 V for 10 minutes. The additional barrier layer 16 (FIG. 4(b)) formed in this step is composed of a portion that is derived from an Al portion lying under the already-existing barrier layer (the Al base of FIG. 4(a)) and a portion that is lying over the Al portion in the volume proportion of 6:4. The Al portion extends under the whole extent of the lower surface of the barrier layer, while the micropores are present only in some areas under the barrier layer. Therefore, the micropores seem to be gradually filled as the anodization advances. For this reason, the amount of the filling in the micropores is estimated in advance, and the duration of the first anodization step is scheduled to be longer according to the estimated amount. After this additional barrier layer formation step, for example, even if the resultant structure is immersed in a phosphoric acid of 10 mass % at 60° C. for 30 minutes such that the micropores are enlarged, formation of pits does not occur.

Note that the thickness of the barrier layer after the additional barrier layer 16 has been formed, d (see FIG. 4(b)), need to be not more than a half of the average interval p between adjacent micropores 12 (p/2). This is because the etching advances isotropically, and this relationship also need to be met even after the etching. Therefore, in the next anodization step, to grow the micropores, the thickness of the barrier layer need to be less than p/2. Specifically, if the average interval p between adjacent micropores 12 is 400 nm, the thickness of the barrier layer, d, is less than 200 nm.

The electrolytic solution which enables such addition of the barrier layer is neutral or weakly acidic; preferably, around pH 5.1. Other than the boric acid, ammonium tartrate, ammonium borate, or the like, may be used.

The mold fabrication method of the embodiment of the present invention enables fabrication of a mold that is formed of an Al base having an anodized film, which can be used without any modification as a mold for formation of a motheye structure. The Al base contains an impurity element and therefore has sufficient rigidity and/or processibility (e.g., machinability). Thus, a mold of an Al base (in the shape of a circular column or circular cylinder), which is for example used for formation of a motheye structure on a surface of a film (e.g., PET film) by a roll-to-roll method, can be fabricated. The motheye structure preferably has a plurality of raised portions each of which has a two-dimensional size of not less than 10 nm and less than 500 nm when seen in a direction normal to the surface. Preferably, the distance between adjacent raised portions is not less than 30 nm and less than 600 nm.

Note that, as described above, in addition to the motheye structure (micro structure), an uneven structure that is larger than the motheye structure (macro structure) may be provided, whereby the antireflection film (antireflection surface) can be provided with an antiglare function. Before the above-described anodization step (FIG. 1(b)), a shape designed for formation of an uneven structure that performs an antiglare function may be given to the surface of the Al base 18, whereby a mold for formation of a surface in which the motheye structure is superposed over the uneven structure that performs an antiglare function can be fabricated using the above-described fabrication method. The uneven structure that performs an antiglare function preferably has a plurality of raised portions each of which has a two-dimensional size of not less than 0.1 μm and not more than 100 μm when seen in a direction normal to the surface. The distance between adjacent raised portions is preferably not less than 0.1 μm and not more than 100 μm.

The shape designed for formation of the uneven structure that performs an antiglare function may be given to the surface of the Al base 18 by a mechanical method, such as sandblast, or by etching with the use of a hydrochloric acid or fluoric acid. As a matter of course, these two methods may be used in combination.

An antireflection film which has a motheye structure can be produced using a mold fabricated as described above. The production method of the antireflection film with the use of the motheye mold can adopt a wide variety of known methods.

For example, by curing a photocurable resin interposed between the motheye mold and a surface of a workpiece, a photocurable resin layer which has a motheye structure may be formed over the surface of the workpiece. If the motheye mold prepared is in the form of a roll, an antireflection film can be formed over a surface of a polymer film (e.g., PET or TAC) using a roll-to-roll method with high mass-production efficiency.

Industrial Applicability

The present invention is applicable to various uses of which antireflection is demanded, typically to optical elements for use in display devices or the like.

Reference Signs List 10 porous alumina layer
12 micropore (very small recessed portion)
13 pit
14 coating
16 additional barrier layer
18 Al base

The invention claimed is:

1. A method of fabricating a mold that is for use in forming a motheye structure over a surface, the motheye structure including a plurality of first raised portions each having a two-dimensional size of not less than 10 nm and less than 500 nm when seen in a direction normal to the surface, the method comprising the steps of:
  (a) preparing an Al base in which an Al content is less than 99.99 mass %;
  (b) partially anodizing the Al base to form a porous alumina layer which has a plurality of very small recessed portions;
  (c) after step (b), allowing the porous alumina layer to be in contact with an etchant which contains an anodic inhibitor, thereby enlarging the plurality of very small recessed portions of the porous alumina layer; and
  (d) after step (c), further anodizing the Al base to grow the plurality of very small recessed portions, wherein the Al base contains not more than 10 ppm of an element whose standard electrode potential is higher than Al and not less than 0.1 mass % of an element whose standard electrode potential is lower than Al, and wherein before step (c), forming an additional barrier layer of alumina formed under the porous alumina layer.

2. The method of claim 1, wherein after step (d), step (c) and step (d) are further performed.

3. The method of claim 1, wherein the Al base contains at least one element that is selected from the group consisting of Fe, Si, Cu, Mn, Zn, Ni, Ti, Pb, Sn, and Mg.

4. The method of claim 1, wherein the Al base contains Mg of not less than 0.1 mass % and not more than 7.0 mass %.

5. The method of claim 1, wherein the anodic inhibitor is organic.

6. The method of claim 1, wherein the etchant contains a compound which forms a coating over a surface of the Al base.

7. The method of claim 1, wherein the etchant contains an organic acid.

8. The method of claim 1, further comprising, before step (b), giving an uneven shape to a surface of the Al base, the uneven shape including a plurality of second raised portions each having a two-dimensional size of not less than 0.1 μm and not more than 100 μm when seen in a direction normal to the surface.

9. A method of producing an antireflection film, comprising:
preparing a mold fabricated according to the fabrication method as set forth in claim 1 and a workpiece; and
forming the motheye structure over a surface of the workpiece using the mold.

10. The method of claim 9, comprising the step of curing a photocurable resin interposed between the mold and the surface of the workpiece, thereby forming a photocurable resin layer which has the motheye structure over the surface of the workpiece.

11. The method of claim 1, wherein the Al base is a self-supporting Al plate.

12. The method of claim 1, wherein the etchant substantially isotropically etches the alumina.

13. The method of claim 1, wherein the etchant includes at least one acid selected from the group consisting of phosphoric acid, formic acid, acetic acid, and citric acid.

14. The method of claim 1, wherein an electrolytic solution in step (b) includes at least one acid selected from a group consisting of sulfuric acid, oxalic acid, and phosphoric acid.

\* \* \* \* \*